No. 761,840. PATENTED JUNE 7, 1904.
J. R. JONES.
CONVERTIBLE PLOW, CULTIVATOR, AND HARROW.
APPLICATION FILED JAN. 7, 1904.
NO MODEL. 2 SHEETS—SHEET 1.
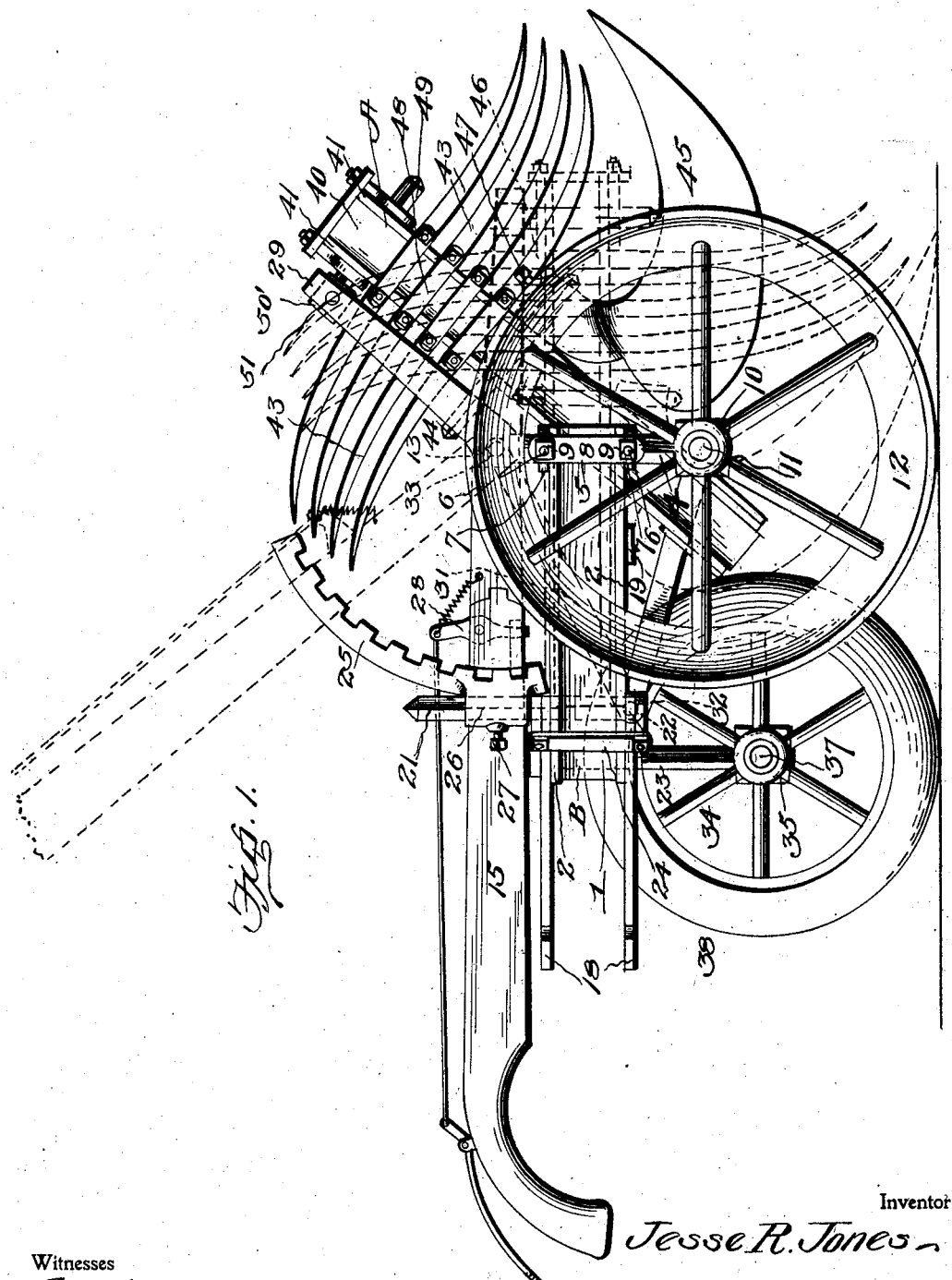
Witnesses
Inventor
Jesse R. Jones
By H. B. Wilson
Attorney No. 761,840. PATENTED JUNE 7, 1904.
J. R. JONES.
CONVERTIBLE PLOW, CULTIVATOR, AND HARROW.
APPLICATION FILED JAN. 7, 1904.
NO MODEL. 2 SHEETS—SHEET 2.
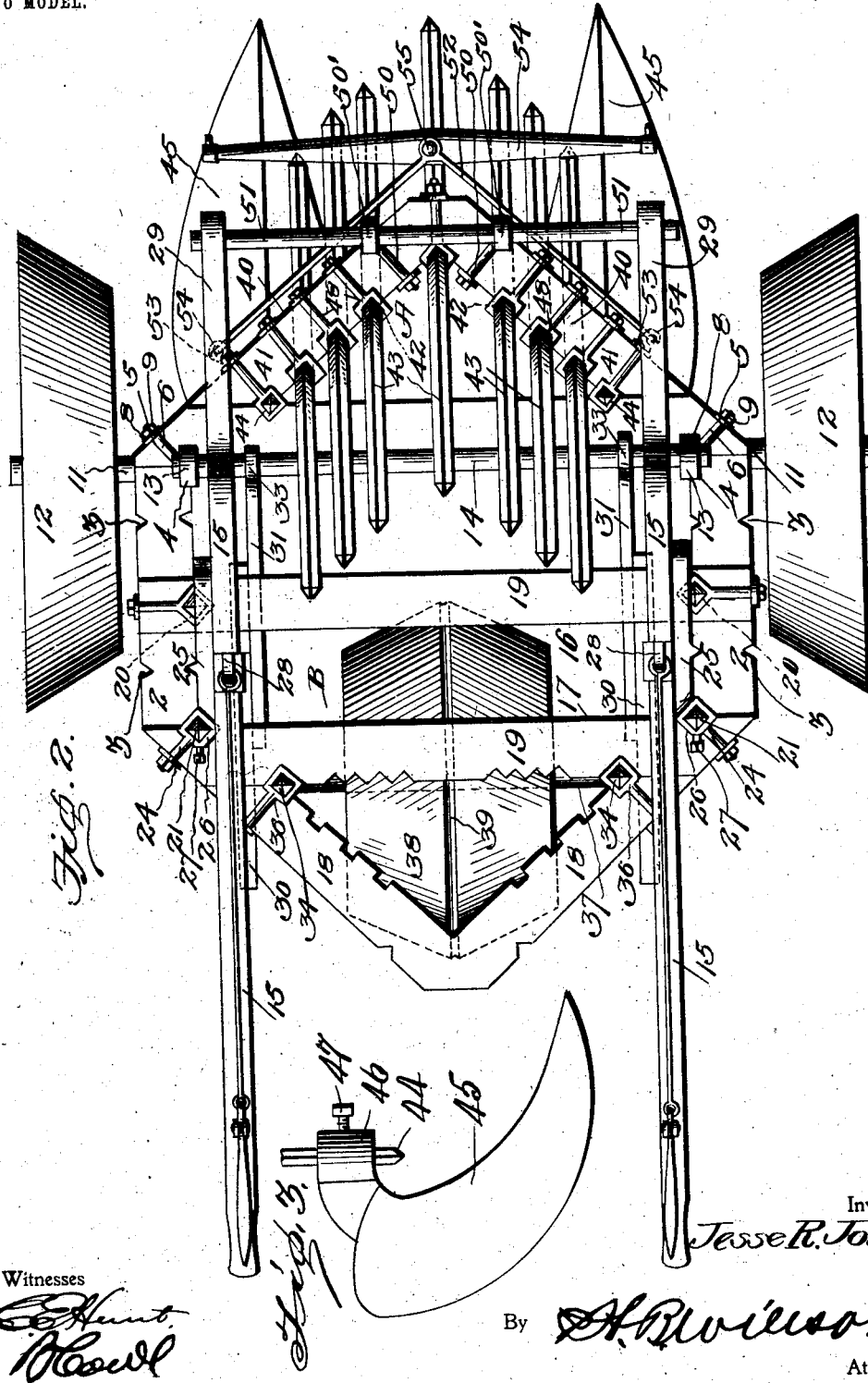
Witnesses
Inventor
Jesse R. Jones.
By
Attorney No. 761,840.

Patented June 7, 1904.

UNITED STATES PATENT OFFICE.

JESSE R. JONES, OF JACKSON, MISSISSIPPI.

CONVERTIBLE PLOW, CULTIVATOR, AND HARROW.

SPECIFICATION forming part of Letters Patent No. 761,840, dated June 7, 1904.

Application filed January 7, 1904. Serial No. 188,072. (No model.)

*To all whom it may concern:*

Be it known that I, JESSE RUBLE JONES, a citizen of the United States, residing at Jackson, in the county of Hinds and State of Mississippi, have invented certain new and useful Improvements in Convertible Plows, Cultivators, and Harrows; and I do declare the following to be a full, clear, and exact description of the invention, such as will enable others skilled in the art to which it appertains to make and use the same.

My invention is an improved convertible implement adapted for use either as a plow, cultivator, or harrow; and it consists in the construction and combination of devices hereinafter described and claimed.

In the accompanying drawings, Figure 1 is a side elevation of a convertible implement embodying my improvements, showing the handles lowered to raise the front frame and in dotted lines showing the handles raised to lower the front frame, to which the tools are attached. Fig. 2 is a top plan view of the same. Fig. 3 is a detail elevation of one of the plows, showing the same attached to one of the shanks.

In the embodiment of my invention I provide a front frame A and a rear frame B, which are adapted to carry tools, such as harrow-teeth, cultivating points or plows, and other tools for operating in the soil, as may be required. The rear frame has wooden side beams 1, on the upper and lower sides of which are flat metallic bars 2, which are wider than the said beams, projecting from opposite sides thereof, and are provided in their said projecting edges with angular notches 3. The said notches 3 of the respective bars 2 are disposed in vertical alinement and extend at intervals from end to end of said bars 2. On the inner sides of the beams 1, at a suitable distance from the front ends thereof, are a pair of vertically-disposed shanks 4, which are angular in cross-section to correspond with the shape of the notches 3 and are of a size to enable them to fit in said notches, and the said shanks are engaged with appropriate notches 3 and are secured to the sides of the frame B by means of clamps 5, which may be of any suitable construction. Each of the said clamps 5 is here shown as comprising a pair of bolts 6, having eyes 7 at their inner ends engaging the shanks 4, the latter passing through said eyes, and a yoke-plate 8 disposed against the inner side of the longitudinal side bar of the beam, provided with openings through which said bolts extend, said bolts having nuts 9 screwed on them, which bear against the outer side of said yoke and coact therewith to clamp the shank 4 in place. Thereby the said shanks 4 are rendered readily detachable from the frame B and are also adapted to be adjustable longitudinally thereon and also to be adjusted vertically, as will be understood. Each of the said shanks 4 has at its lower end an eye 10, forming a bearing for an axle-shaft 11. On the ends of the said axle-shaft are secured a pair of carrying-wheels 12, which are here shown as of frusto-conical form and are disposed with their sides of less diameter innermost. The upper ends of the shanks 4 are provided with eyes 13. A rod 14 is extended through the said eyes and forms the pivot for the handles 15, which constitute the levers for raising and lowering the front ends of the front frame A.

The side members of the rear frame B are connected together by a cross-bar 16, a cross-bar 17 disposed at a suitable distance in rear of the bar 16, and by a pair of rearwardly-converging angle-bars 18, the latter constituting the rear end of the rear frame, as shown. Each of the cross-bars 16 17 is here shown as comprising a pair of flat metallic bars 19, disposed on the upper and lower sides of the side members of the rear frame, and the angle-bars 18 are also disposed on the upper and lower sides of said side members. The bars 19 of the cross-bar 16 are provided at suitable distances from their ends with openings 20, which coincide with notches in the upper and lower bars of the side members of the rear frame, and in the said coinciding openings and notches are disposed a pair of cross-sectionally-angular shanks 21, which are similar in construction to the shanks 4, hereinbefore described, and are provided at their lower ends, which project below the rear frame, with eyes 22, through which extends a transverse rod 23. The said shanks 21 are secured to the side members of the rear frame and are adapted to be vertically adjusted thereon by means of clamps 24, which are similar in construction to the clamps hereinbefore described in connection with the shanks 4. On the upper portions of the shanks 21 are vertically-adjustable segment-bars 25, which are provided on their outer rear sides with sleeves 26, which may be formed integral therewith, the openings through the said sleeves being angular in cross-section and of a size and shape to enable them to receive the shanks 21. Said sleeves are further provided with set-screws 27, which by impinging on the said shanks secure the segment-bars thereto. It will be understood that the segment-bars are thus rendered detachable from the shanks and that they may be readily adjusted vertically thereon. The handles 15 are provided with locking-dogs 28, which by engagement with the segment-bars 25 secure the said handles at any desired vertical angular adjustment. The front ends of the said handles are provided with upturned arms 29.

Between the plates or bars 17 18 of the rear frame B are secured coupling-bars 30, which are preferably made of wood, the said bars 30 being parallel with the side members of the rear frame and disposed at a suitable distance from the inner sides thereof. On the inner sides of the said coupling-bars are bolted a pair of inclined stay-bars 31, having eyes 32 at their lower rear ends through which the rod 22 extends and having similar eyes 33 at their upper front ends through which the rod 14 extends, which rod, as hereinbefore described, forms the pivot for the handles 15 and connects the upper ends of the shanks 4 together.

In coincident notches of the bars 17 18 of the rear frame are secured shanks 34, which are similar in construction to the shanks 4 and 21, hereinbefore described, and are provided at their lower ends with eyes 35. Clamps 36, which are similar to the clamps hereinbefore described, are employed in connection with the notch-bars 17 18 to secure the said shanks 34 in place and permit of their vertical adjustment. An axle-rod 37 has its bearings in the eyes 35 of the shanks 34, and on the center of the said rod are a pair of wheels, so disposed as to form a double-frusto-conical-shaped opening-wheel 38, the smaller sides being outermost.

The front frame A is somewhat similar in construction to the rear frame B. Its side members 40 converge forwardly to a point, as shown, and the bars 41 on the upper and lower sides of its side members are provided in their projecting edges with angular notches 42, adapted for the reception of vertically-disposed cross-sectionally-angular harrow-teeth 43 or shanks 44, adapted for the attachment of tools, such as plows 45 or the like, provided with sleeves 46, having cross-sectionally-angular openings to fit on the shanks 44 and set-screws 47 to clamp them on said shanks.

The said shanks and also the said harrow-teeth are secured to the notched bars 41 and in the notches 42 thereof by means of clamps 48, which are similar in construction to the clamps hereinbefore described. The harrow teeth here shown are in pairs or double-ended, one end of each forming a slightly-curved tooth, and the other, which is on a longer curve, being broadened to form a turning share or plow. The opposite ends of these teeth are reversely curved, and either their harrow-tooth ends or their share or shovel ends may be engaged with the soil. By appropriately adjusting the teeth when their share or shovel ends are disposed for operation they may be caused to turn the soil either outwardly or inwardly. The teeth may also be adjusted angularly, laterally, and may be so set as to cause their engaging points to trail rearwardly instead of extend forwardly, as here shown. In appropriate notches 42 of the front frame are secured cross-sectionally-angular bars 49 by means of clamps 50, which are similar in construction to the clamps hereinbefore described. Said bars 49 have eyes 50' at their upper ends, connected by a cross bar or rod 51, which extends through them and to which the angularly-disposed arms 29 of the handle-levers 15 are pivotally connected, as shown. The rear portions of the front frame A, which carries various tools for operating in the soil, bear on the axle-shaft 11 of the carrying-wheels 12, and the front end of the said front frame being connected to the handle-levers, as hereinbefore described, it follows that the said front frame may be raised and lowered by means of the handle-levers to regulate the depth of the implements in the soil or disengage them therefrom, as may be required.

It be will understood that the wheels 12 and 38 when employed as here shown support my improved convertible implement and that when the front frame is elevated the implement, by the use of the handle-levers, may be readily turned at the end of a row. Within the scope of my invention other means in lieu of the wheels may be employed to support the rear frame. For instance, earth-working implements, such as harrow or cultivator teeth or plows, may be employed for this purpose. Hence I do not desire to limit myself in this particular.

It will be understood that the several tools are detachable, adjustable, and interchangeable, and that my improved implement may be used for all the purposes of a plow, cultivator, and harrow.

A clevis 52 is shown in Fig. 2 as connected to the front frame by means of clamps 53, having hooks 54, and to the said clevis is connected a swingletree 54 by means of a bolt 55.

Having thus fully described my invention, what I claim as new, and desire to secure by Letters Patent, is—

1. An implement of the class described, comprising a supporting-frame having side bars, cross-bars, and rearwardly-converging bars connecting the rear ends of the side bars, said bars having side notches, and said cross-bars and rearwardly-converging bars being detachable from said side bars, clamps, connecting said bars together and including shanks engaging certain of the notches thereof, axles secured by certain of said shanks; supporting-wheels on said axles, handle-levers pivotally connected to certain of said shanks, above said supporting-frame, and an implement-carrying frame, carried by the supporting-frame and connected to said levers, the latter serving for raising and lowering said implement-carrying frame.

2. An implement of the class described, comprising a supporting-frame having front and rear supporting-wheels, the axle of the front wheels being below the front portion of said frame, an implement-carrying frame, having its rear portion resting on said front axle, said implement-carrying frame extending in front of the supporting-frame, and handle-levers supported by the supporting-frame and connected to the implement-carrying frame, to raise and lower the front end thereof.

3. An implement of the class described, comprising a supporting-frame having supporting elements to run on the ground, an implement-carrying frame, and means, carried by the supporting-frame and connected to the implement-carrying frame to raise and lower the latter.

4. An implement of the class described, comprising a supporting-frame have side supporting-wheels and a centrally-disposed opening-wheel, an implement-carrying frame in advance of said supporting-frame, and handle-levers carried by the supporting-frame and connected to the implement-carrying frame, to raise and lower the latter.

5. An implement of the class described, comprising a supporting-frame having side bars, cross-bars, and rearwardly-converging bars connecting the rear ends of the side bars, said bars having side notches, and said cross-bars and rearwardly-converging bars being detachable from said side bars, clamps connecting said bars together and including shanks engaging certain of the notches thereof, front and rear axles secured, below said frame, by certain of said shanks, handle-levers pivotally connected to the upper ends of the shanks that secure the front axle, and an implement-carrying frame having its rear portion resting on said front axle, said implement-carrying frame extending in front of the supporting-frame and being connected to said levers, the latter serving for raising and lowering the front end of said implement-carrying frame.

In testimony whereof I have hereunto set my hand in presence of two subscribing witnesses.

JESSE R. JONES.

Witnesses:
D. H. HOLDER,
JAS. A. JONES, Jr.